United States Patent Office.

FREDERICK GRINNELL, OF NEW BEDFORD, MASSACHUSETTS, ASSIGNOR TO THE GENERAL FIRE EXTINGUISHER COMPANY, OF NEW YORK, N. Y.

VALVE.

SPECIFICATION forming part of Letters Patent No. 677,076, dated June 25, 1901.

Application filed December 17, 1897. Serial No. 662,336. (No model.)

*To all whom it may concern:*

Be it known that I, FREDERICK GRINNELL, of New Bedford, in the county of Bristol and State of Massachusetts, have invented certain new and useful Improvements in Valves; and I do hereby declare the following specification, taken in connection with the accompanying drawings, forming a part of the same, to be a full, clear, and exact description thereof.

The invention relates to that class of valves in which a liquid, usually water, under pressure is held in check by a valve which is held to its seat by the action of a less pressure and is released and forced from its seat by the action of the liquid when said light pressure is reduced. Such valves are especially useful in connection with automatic sprinkler systems in which the water is held in check by a valve held to its seat by the action of a light air-pressure in the system, and the present invention is especially designed for use in connection with such systems, although its use is not confined thereto.

Valves of the above class are usually provided with a movable member which is subjected upon one side to the light pressure in the system and upon the other side to a less pressure, usually about atmospheric, said movable member being arranged to hold the valve closed by reason of its greater area or by reason of the connections between said member and the valve. When such a valve is opened by the reduction of the light pressure in the system, the system is filled with water and a column of water is formed above the movable member. Should the valve for any reason now return to its seat, the column of water above the movable member may be of sufficient height to hold the valve to its seat and prevent any further flow of water to the system. A valve thus held to its seat is said to be "columned." With this class of valves it is desirable, especially in connection with fire-extinguisher systems, where it is essential that the supply of water shall not be prematurely shut off after the valve has been opened by the opening of a sprinkler, to provide means for preventing columning.

It is accordingly the object of this invention to provide simple and efficient means for preventing columning of the valve when once opened, and this is accomplished by operating the means for preventing columning by the movement of the valve in opening. The means for preventing the columning of the valve may be purely mechanical, or it may be hydraulic means, or a combination of both.

Figure 1:
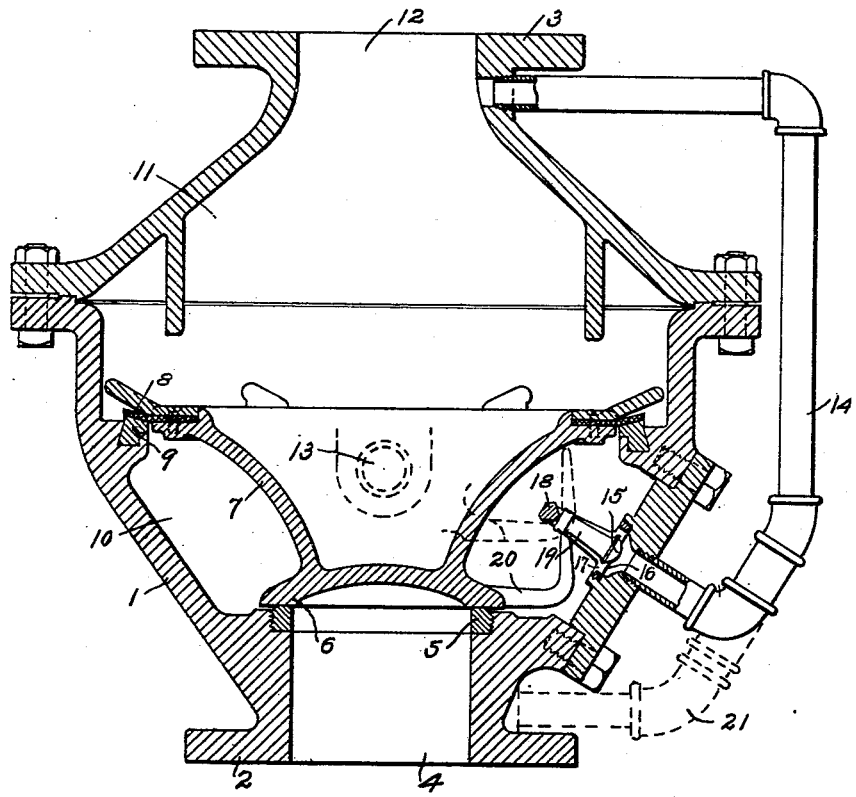

In the accompanying drawings I have shown three modifications of the present invention applied to a differential valve similar to that shown in Figure 1 of my Patent No. 372,220, granted October 25, 1887; but it will be understood that the invention may be applied with equal advantage to the various forms of valves shown in said patent or to other forms of valves in which a comparatively light pressure acts to hold the valve closed against a higher pressure.

Figure 3:
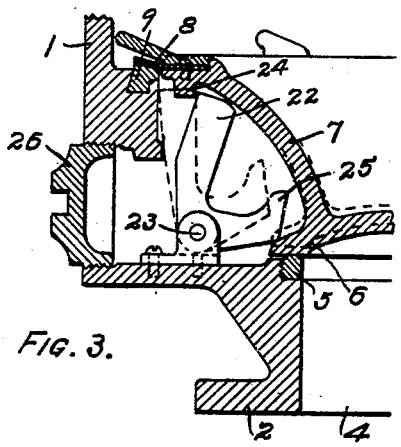
Figure 2:
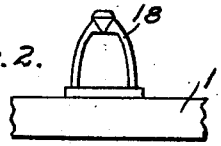
Figure 4:
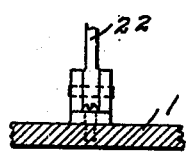

Referring to the drawings, Fig. 1 shows a sectional view of a valve embodying one form of the present improvement. Fig. 2 is a detail view. Fig. 3 is a detached sectional view showing a modified form of the improvement, and Fig. 4 is a detail view.

Referring to Fig. 1, 1 is the valve-casing, provided with flanges 2 and 3 for connecting said casing to a supply-pipe and delivery-pipe, respectively. The inlet 4 is provided with a valve-seat 5 for a valve 6. The valve 6 is formed on a dish-shaped member 7, which is provided with a flexible ring 8, arranged to seat upon the valve-seat 9. In this form of valve the member 7 and the wall of the casing 1 between the valve-seats 5 and 9 form an intermediate or supplemental chamber 10, and the space above the member 7 forms a light-pressure chamber 11, which is connected with the system through the outlet 12. The chamber 10 is preferably connected with the atmosphere through the usual drip-pipe 13; but the pressure in said chamber may, if desired, be either above or below atmospheric pressure, provided said pressure is less than the pressure in chamber 11. The drip-pipe is provided with the usual valve, which closes under an extra pressure when the main valve opens. The walls of the movable member 7 between the chambers 10 and 11 are subjected to light pressure on one side and to a less pressure on the other side, and the member 7 is connected to the main valve by being formed integral therewith. The valve-seat 9 is of such a diameter that the pressure upon the top of the member 7 exerted by the light pressure will be sufficient to hold the valve 6 to its seat.

As thus far described the valve is of a well-known construction in common use and is merely shown as an illustration of one of many forms of valves to which the invention may be applied. The means for preventing columning of the valve embodying the present invention will now be described.

A passage consisting in the form shown of the piping 14 connects the chamber 10 with the light-pressure chamber 11 or with the system. This passage is normally closed by a spherical valve 15, which engages a valve-seat formed in the diaphragm 16, held in position at the entrance to the piping 14 by the ring 17. The ring 17 also supports a yoke 18, which engages the end of the valve-stem 19 and holds the valve 15 to its seat. An arm 20 is secured to the valve 6 and is arranged to engage the valve-stem 19. When the valve 6 opens by reason of the reduction of pressure in chamber 11, the arm 20, acting on the valve-stem 19, rocks the valve 15 on its seat and forces the valve-stem out of engagement with the yoke 18, when the valve drops away from its seat and a permanent communication is opened between the chambers 10 and 11. Should the valve 6 now close for any reason, the column of water above the valve would not act to hold the valve to its seat against the pressure in the supply-pipe, since by reason of the communication between the chambers 10 and 11 the differential feature of the valve is destroyed and the pressure is always the same on both sides of the movable member between the light-pressure and supplemental chambers. In other words, the movement of the main valve prevents columning of the valve by opening a passage between the supplemental chamber and the system which does not close when the valve closes. After the valve 6 has once opened it then has the action of a simple check-valve, which will prevent flow of water from the system to the supply-pipe, but will not prevent flow of water from the supply to the system.

Instead of causing the movement of the valve to open a passage between the supplemental chamber and the system, columning of the valve may be prevented by causing the movement of the valve to open a passage between the supply-pipe and said chamber. This passage may consist of piping 21, (shown in dotted lines in Fig. 1,) and the passage may be closed by the valve shown and described and opened, as above described, by the movement of the valve 6. This construction also embodies the features of invention set forth in the claims of an application filed of even date herewith, Serial No. 662,338. In this case after the valve 15 is opened by the movement of valve 6 the pressure in chamber 10 remains the same as the pressure in the supply-pipe even if the valve 6 closes, and the valve-ring 8 will act as a simple check-valve to prevent flow of water from the system to the supply, but will not prevent flow of water from the supply to the system.

In Fig. 3 is shown one form of a purely mechanical means operated by the movement of the main valve in opening for preventing columning of the valve. This construction also embodies the features of invention set forth in the claims of an application filed of even date herewith, Serial No. 662,337. In this case the columning is prevented by preventing the closing of the valve after it has once opened, and in the form shown the means for effecting this consists of a latch or stop 22, which is pivoted at 23 and is arranged to be moved under a flange or lug 24 on the member 7 by the movement of the valve 6 in opening. The latch 22 is provided with a lever-arm 25, which extends into the path of the valve 6. When the valve opens, it engages the arm 25 and positively rocks the latch 22 into the dotted-line position, where it acts as a stop to prevent the valve returning to its seat, and thus becoming columned. The latch may be moved back in resetting the valve by removing the plug 26.

In each of the above cases it will be noted that the means for preventing columning of the valve is positively operated by the movement of the valve itself in opening, and there is no possibility of columning when the valve has once opened.

While the invention has been illustrated in connection with a differential valve, it will be understood that it is equally applicable to valves which are not, strictly speaking, differential valves, but in which a comparatively light pressure acts to hold the main valve closed and in which there is danger of columning should the valve close after once opening. It will also be understood that the passage between the supplemental or intermediate chamber and light-pressure chamber or the supply may be arranged or formed in various ways and that any suitable form of valve may be used to normally close said passage and any suitable means employed for operating or releasing the valve by the movement of the main valve in opening.

What I claim as my invention, and desire to secure by Letters Patent, is—

1. The combination with a valve, of means for holding said valve closed against pressure by the action of a less pressure, and means positively operated by the valve in opening for preventing columning of the valve.

2. The combination with a valve, of a light-pressure chamber, a supplemental chamber, a movable member between said chambers acting to hold said valve closed, and means positively operated by the valve in opening for preventing columning of said valve.

3. The combination with a valve, of a light-pressure chamber, a supplemental chamber, a movable member between said chambers for holding the valve to its seat by the action of the light pressure, a passage between said chambers, means normally closing said passage, and operated by the movement of the valve to open said passage.

4. The combination with a valve, of a light-pressure chamber, a supplemental chamber, a movable member between said chambers for holding the valve to its seat by the action of the light pressure, a passage between said chambers, a valve normally closing said passage and opened by the movement of the main valve in opening.

5. The combination with a valve-casing, of a differential valve therein, a supplemental chamber closed by said valve, a passage leading from the chamber into the casing upon one side of the valve, means normally closing said passage and operated by the movement of the valve to open said passage.

6. The combination with a valve-casing, of a differential valve therein, a supplemental chamber closed by said valve, a passage from the chamber into the casing upon the discharge side of the valve, a valve normally closing said passage, and means for opening said valve by the movement of the main valve in opening.

7. The combination with a valve-casing, of a differential valve therein, a supplemental chamber closed by said valve, a passage from said chamber into the casing upon the discharge side of the valve, a valve in said chamber for closing said passage, and an arm on the main valve for engaging and releasing said latter valve.

FREDERICK GRINNELL.

Witnesses:
W. H. THURSTON,
R. A. BATES.